(12) United States Patent
Xu et al.

(10) Patent No.: US 11,713,997 B2
(45) Date of Patent: Aug. 1, 2023

(54) INDOOR DETECTIONS BASED ON AMBIENT LIGHT

(71) Applicant: HUAWEI TECHNOLOGIES CO., LTD., Guangdong (CN)

(72) Inventors: Yurong Xu, Santa Clara, CA (US); Jun Yang, Santa Clara, CA (US)

(73) Assignee: Huawei Technologies Co., Ltd., Shenzhen (CN)

(*) Notice: Subject to any disclaimer, the term of this patent is extended or adjusted under 35 U.S.C. 154(b) by 92 days.

(21) Appl. No.: 17/425,192

(22) PCT Filed: Jan. 21, 2020

(86) PCT No.: PCT/CN2020/073561
§ 371 (c)(1),
(2) Date: Jul. 22, 2021

(87) PCT Pub. No.: WO2020/151712
PCT Pub. Date: Jul. 30, 2020

(65) Prior Publication Data
US 2022/0128399 A1    Apr. 28, 2022

Related U.S. Application Data

(60) Provisional application No. 62/795,099, filed on Jan. 22, 2019.

(51) Int. Cl.
*G01J 1/42* (2006.01)
*H05B 47/11* (2020.01)
*H05B 47/13* (2020.01)
*G01J 1/44* (2006.01)
*G01J 5/60* (2006.01)

(52) U.S. Cl.
CPC ............... *G01J 1/4204* (2013.01); *G01J 1/44* (2013.01); *G01J 5/60* (2013.01); *H05B 47/11* (2020.01); *H05B 47/13* (2020.01)

(58) Field of Classification Search
CPC ............ G01J 5/60; H05B 47/11; H05B 47/13
See application file for complete search history.

(56) References Cited

U.S. PATENT DOCUMENTS

2020/0022239 A1* 1/2020 Hung .................... H05B 47/11

* cited by examiner

*Primary Examiner* — Georgia Y Epps
*Assistant Examiner* — Don J Williams
(74) *Attorney, Agent, or Firm* — Fish & Richardson P.C.

(57) ABSTRACT

The present disclosure relates to methods and devices for indoor-outdoor detection. One example computer-implemented method for indoor-outdoor detection by an electronic device includes receiving, from an ambient light sensor in the electronic device, light intensity data. The electronic device determines an indoor-outdoor feature indicator based on the light intensity data. The electronic device determines whether the electronic device is in an indoor environment or an outdoor environment based on the indoor-outdoor feature indicator.

17 Claims, 4 Drawing Sheets

INDOOR DETECTIONS BASED ON AMBIENT LIGHT

CROSS-REFERENCE TO RELATED APPLICATIONS

This application is a national stage of International Application No. PCT/CN2020/073561 filed on Jan. 21, 2020, which claims priority to U.S. Provisional Application No. 62/795,099, filed 22 Jan. 2019. Both of the aforementioned applications are incorporated herein by reference in their entireties.

TECHNICAL FIELD

This disclosure relates to indoor detections based on ambient light by an electronic device.

BACKGROUND

For certain applications, it is desirable for an electronic device to preform accurate indoor-outdoor detection. For example, the electronic device can trigger location-based services if the electronic device determines that the electronic device has entered into an indoor environment. For example, the electronic device can trigger operations of a home automation system, an alarm system, a hospital patient care system, or other location-based service system in response to detecting that the electronic device moves into an indoor environment.

SUMMARY

The present disclosure describes indoor detections based on ambient light by an electronic device.

In a first implementation, a method for indoor-outdoor detection by an electronic device includes: receiving, from an ambient light sensor in the electronic device, light intensity data; determining, by one or more hardware processors in the electronic device, an indoor-outdoor feature indicator based on the light intensity data; and determining, by the one or more hardware processors, whether the electronic device is in an indoor environment or an outdoor environment based on the indoor-outdoor feature indicator.

In a second implementation, an electronic device includes: an ambient light sensor; a non-transitory memory storage comprising instructions; and one or more hardware processors in communication with the memory storage, wherein the one or more hardware processors execute the instructions to: receive, from the ambient light sensor, light intensity data; determine an indoor-outdoor feature indicator based on the light intensity data; and determine whether the electronic device is in an indoor environment or an outdoor environment based on the indoor-outdoor feature indicator.

In a third implementation, a non-transitory computer-readable medium storing computer instructions for processing a data packet in a communication network, that when executed by one or more hardware processors, cause the one or more hardware processors of a router to perform operations including: receiving, from an ambient light sensor in an electronic device, light intensity data; determining, by one or more hardware processors in the electronic device, an indoor-outdoor feature indicator based on the light intensity data; and determining, by the one or more hardware processors, whether the electronic device is in an indoor environment or an outdoor environment based on the indoor-outdoor feature indicator.

The previously described implementation is implementable using a computer-implemented method; a non-transitory, computer-readable medium storing computer-readable instructions to perform the computer-implemented method; and a computer-implemented system comprising a computer memory interoperably coupled with a hardware processor configured to perform the computer-implemented method and the instructions stored on the non-transitory, computer-readable medium.

The details of one or more implementations of the subject matter of this specification are set forth in the accompanying drawings and the description. Other features, aspects, and advantages of the subject matter will become apparent from the description, the drawings, and the claims.

DETAILED DESCRIPTION

Figure 1:
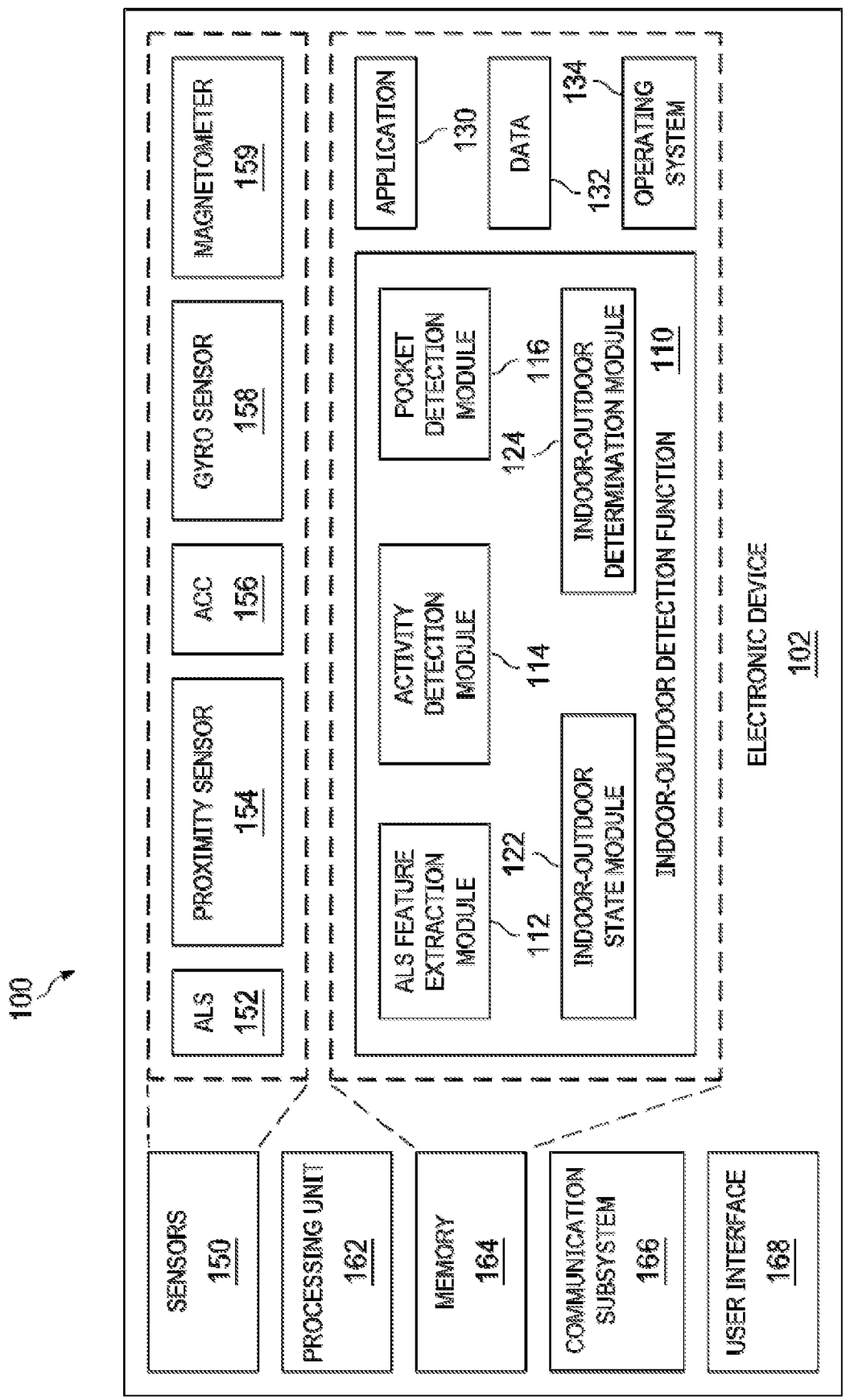
FIG. 1 is schematic diagram showing an electronic device that performs indoor detections, according to an implementation.

The following detailed description describes indoor detections based on ambient light by an electronic device and is presented to enable any person skilled in the art to make and use the disclosed subject matter in the context of one or more particular implementations.

Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail inasmuch as such details are within the skill of one of ordinary skill in the art. The present disclosure is not intended to be limited to the described or illustrated implementations, but to be accorded the widest scope consistent with the described principles and features.

The ability to detect whether an electronic device is currently located in an indoor environment is an important feature for the electronic device. For example, to provide location based services, an electronic device may rely on an accurate indoor detection result. Different location-based service operations may be triggered if the electronic device determines that it has moved into an indoor environment. For example, the electronic device can trigger operations of a home automation system, an alarm system, a hospital patient care system, or other location-based service system in response to detecting that the electronic device moves into an indoor environment.

The electronic device may include a location determination component such as a Global Positioning System (GPS) component that determines the location of the electronic device. However, such a component generally does not provide a result that is precise enough to differentiate whether the electronic device is indoor or outdoor. Moreover, GPS and other location determination components consume a substantial amount of power. Therefore, they do not operate in an always-on mode. Instead, they are turned on by the electronic device (for example, triggered by an application that requests the current location of the electronic device. Accordingly, it would be difficult to use such a component to perform an indoor detection as soon as the electronic device enters into an indoor environment.

Alternatively, an electronic device can perform the indoor detection by measuring the strength of variation of a magnetic field in different locations, or evaluating different characteristics of wireless communication signals received by the electronic device. However, these measurements or evaluations may have significant variations, and therefore may not provide a reliable detection result.

In some implementations, the electronic device can perform indoor detections by using other sensors that operate in an always-on state. One example of such sensors is the ambient light sensor. The ambient light sensor can detect the intensity of the ambient light surrounding the electronic device. The ambient light intensity data detected by the ambient light sensor can be used to adjust brightness of the display of the electronic device. To perform indoor-detection, the electronic device can process the light intensity data to determine the spectral energy of the ambient light over different frequency regions. By evaluating the spectral energy over frequency regions that are associated with alternating current, the electronic device can determine whether the electronic device is located in an indoor environment or an outdoor environment. In some cases, if the electronic device determines that the electronic device has moved into an indoor environment, the electronic device can further trigger the location determination component to determine the current location and trigger related location-based service accordingly. For example, if the electronic device determines that the electronic device has entered into an indoor environment, and the location determination component reports that the electronic device is near a home address of the user of the electronic device, the electronic device can trigger a smart home automation system to turn on the light, put on music, or perform other configured home automation services. The electronic device can also trigger an alarm system to turn off the alarm. In another example, if the electronic device belongs to a registered patient of a hospital, the electronic device determines that the electronic device has entered into an indoor environment, and the location determination component reports that the electronic device is near the address of the hospital, the electronic device can notify a hospital patient care system of the hospital that the patient has entered into the building, and trigger patient care preparation procedures for the patient.

In some cases, the indoor-detection results based on the measurement data of the ambient light sensor can be filtered to improve the accuracy of the prediction. In addition, the indoor detection process can be further enhanced based on the data provided by other sensors. Examples of these sensors include a proximity sensor, an accelerometer, a gyro sensor, a magnetometer. Measurement data reported by these sensors can be used to determine the motion activity of the electronic device. The motion activity can indicate a change of the environment in which the electronic device is located. By combining the motion activity detection with the measurement data of the ambient light sensor, the electronic device can determine that the electronic device has moved from an indoor environment to an outdoor environment, or moved from an outdoor environment to an indoor environment, and trigger location-based services based on such a determination. FIGS. 1-5 and associated descriptions provide additional details of these implementations.

FIG. 1 is schematic diagram 100 showing an electronic device 102 that performs indoor detections, according to an implementation. The electronic device 102 includes sensors 150, a processing unit 162, a memory 164, a communication subsystem 166, and a user interface 168. An electronic device may include additional, different, or fewer features, as appropriate.

The sensors 150 includes an ambient light sensor (ALS) 152, a proximity sensor 154, an accelerometer (ACC) 156, a gyro sensor 158, and a magnetometer 159. The electronic device 102 can also include other sensors, e.g., a barometer, a hygrometer, a thermometer, an infrared sensor, or any combinations thereof.

Figure 2:
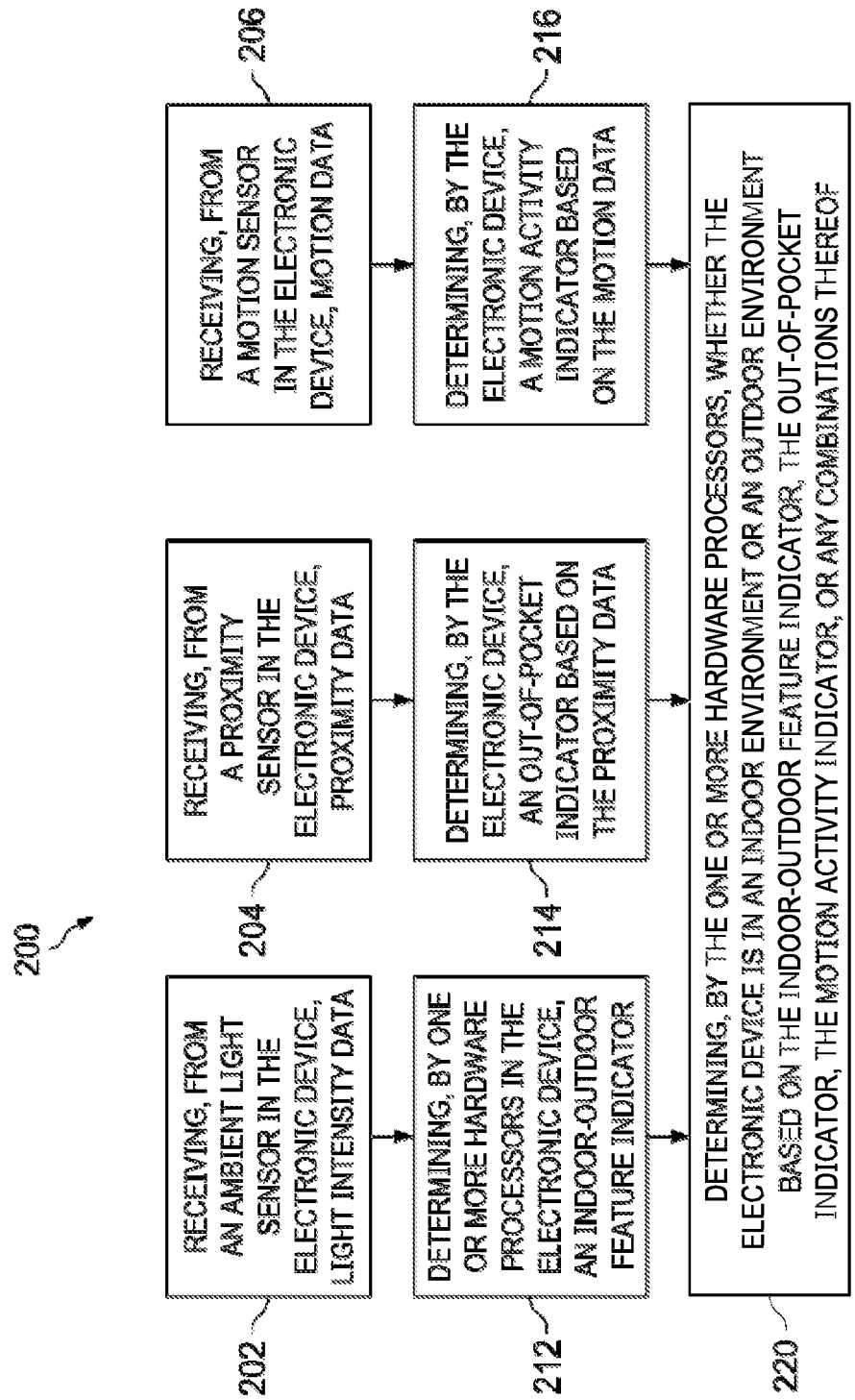
FIG. 2 is a flow diagram illustrating an example method for an indoor detection process, according to an implementation.
Figure 3:
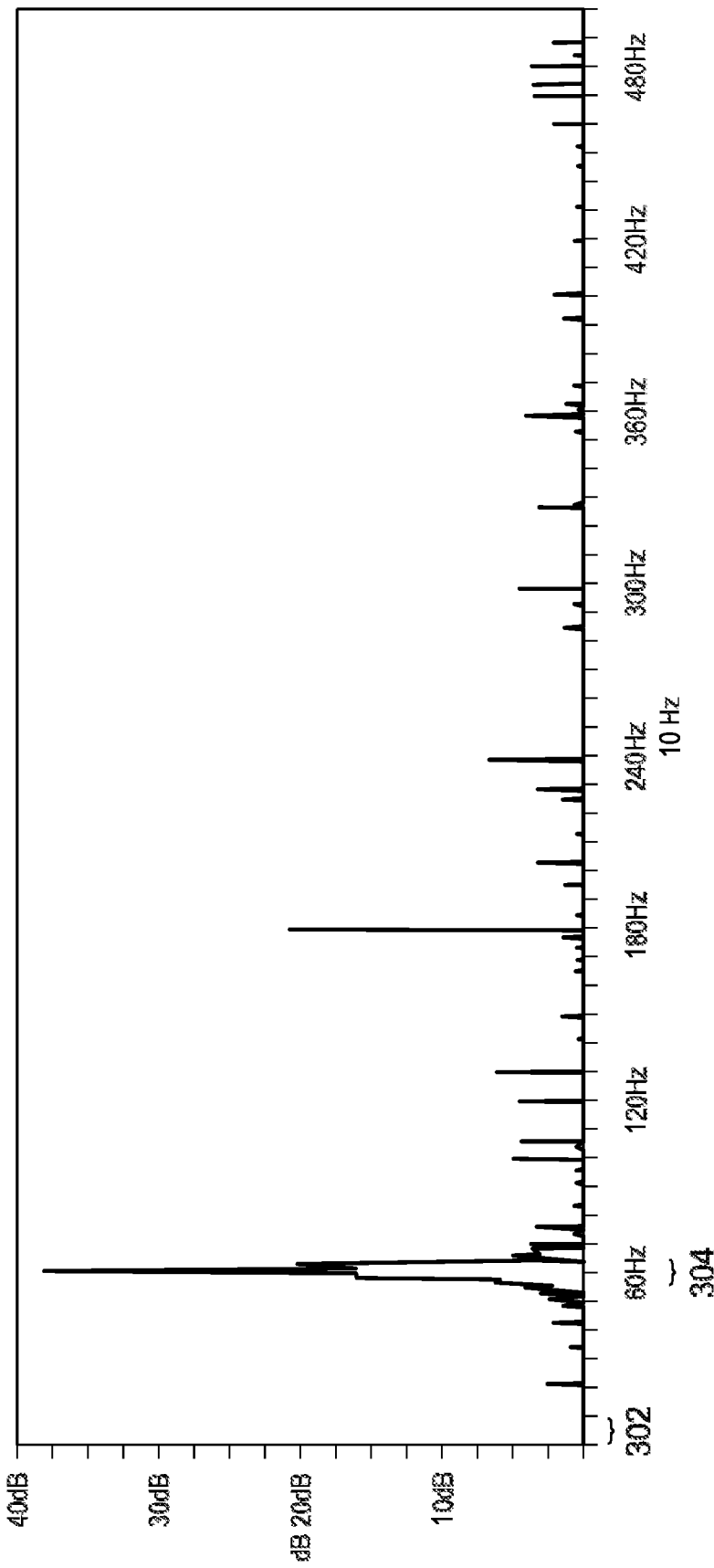
FIG. 3 is a chart illustrating spectral energy generated based on example light intensity data, according to an implementation.
Figure 4:
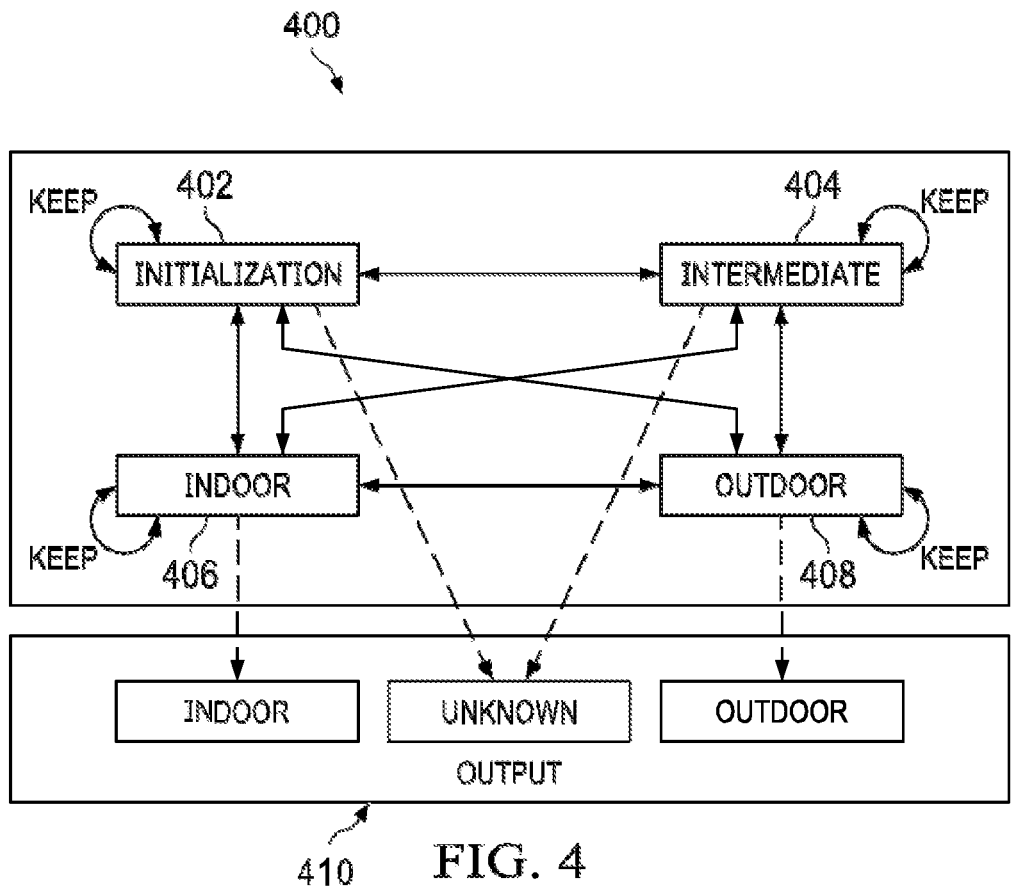
FIG. 4 illustrates an example indoor detection state diagram, according to an implementation.

The ALS 152 is a photodetector that senses the amount of ambient light. The ALS 152 can be implemented using phototransistors, photodiodes, photonic integrated circuits, or any combinations thereof. In some cases, the electronic device 102 can dim the screen if the ALS 152 detects bright light surrounding the electronic device 102. The ALS 152 can be used to generate the light intensity data for the ambient light surrounding the electronic device 102. FIGS. 2-4 and associated descriptions provide additional details of these implementations. In some cases, the ALS 152 can include a buffer (e.g., an 8×16 bit buffer) that stores the light intensity data temporarily. The ALS 152 can send the light intensity data when the buffer is full. This approach can reduce the frequency of sending data and save power.

The proximity sensor 154 is a sensor that is configured to detect the presence of nearby objects of the electronic device 102. The proximity sensor 154 can be implemented using capacitive proximity sensor, photoelectric sensor, inductive proximity sensor, or any combinations thereof. The proximity sensor 154 can be used to detect whether the electronic device is in a pocket. FIGS. 2-4 and associated descriptions provide additional details of these implementations.

The ACC 156 is a sensor that is configured to measure the acceleration of the electronic device 102 in different directions. The ACC 156 can be implemented using micromachined microelectromechanical systems (MEMS) accelerometers. The ACC 156 can be used to detect a movement of the electronic device 102. FIGS. 2-4 and associated descriptions provide additional details of these implementations.

The gyro sensor 158 is a gyroscope that is configured to measure an orientation and angular velocity. The gyro sensor 158 can be implemented using a spinning wheel or disc, or microchip-packaged MEMS. The gyro sensor 158 can be used to detect a movement of the electronic device 102. FIG. 2-4 and associated descriptions provide additional details of these implementations.

The magnetometer 159 is a magnetic sensor that measures magnetism. The magnetometer 159 can be configured to measure a change of a direction or a strength of a magnetic field surrounding the electronic device 102. Therefore, like the ACC 156 and the gyro sensor 158, the magnetometer 159 can also be used to detect a movement of the electronic device 102. FIG. 2-4 and associated descriptions provide additional details of these implementations.

The example processing unit 162 can include one or more processing components (alternatively referred to as "processors" or "central processing units" (CPUs)) configured to execute instructions related to one or more of the algorithms, methods, functions, processes, flows, and procedures, as described in the instant disclosure. Each of the processing component can be implemented in software, hardware, an FPGA (field programmable gate array), an ASIC (application specific integrated circuit), or a combination of these and other implementations. The processing unit 162 can also include other auxiliary components, such as random access memory (RAM) and read-only memory (ROM).

In some implementations, the processing unit 162 can include multiple processors that execute different processing tasks. For example, the processing unit 162 can include a modem processor that executes communication processing tasks, e.g., generating control information such as a measurement report, processing received control information such as channel assignment from a network node. The processing unit 162 can also include an application processor that executes the processing tasks of an operating system, a user interface, or an application program on the electronic device 102.

The processing unit 162 can also include low-power processors that process the data received from the sensors 150. In one implementation configuration, the processing unit 162 can include a sensor hub. The sensor hub can include processors that perform operations such as sampling and Fourier Transform on the sensor data.

The example memory 164 can be a computer-readable storage medium on the electronic device 102. Examples of the memory 164 include volatile and non-volatile memory, magnetic media, optical media, random access memory (RAM), read-only memory (ROM), removable media, and others. The memory 164 can store an operating system (OS) of the electronic device 102 and various other computer-executable software programs for performing one or more of the processes, steps, or actions described above.

The memory 164 can store applications, data, operating system, and extensions for the electronic device 102. The memory 164 can be Random Access Memory (RAM), Read-Only Memory (ROM), optical, magnetic, and the like, storing data or instructions consistent with this disclosure. In some implementations, the memory 164 can be a combination of two or more different types of memory (for example, a combination of RAM and magnetic storage), according to particular implementations of the electronic device 102 and the described functionality. Although illustrated as a single memory 164 in FIG. 1, two or more memories 164 (of the same or a combination of types) can be used according to particular implementations of electronic device 102 and the described functionality. While memory 164 is illustrated as an integral component of the electronic device 102, in alternative implementations, memory 164 can be external to the electronic device 102.

As illustrated, the memory 164 stores an indoor-outdoor detection function 110, an application 130, data 132, and an operating system 134.

The indoor-outdoor detection function 110 represented an application, set of applications, software, software modules, hardware, or any combinations thereof, that can be configured to perform indoor detection based on data received from the sensors 150. The indoor-outdoor detection function 110 includes an ALS feature extraction module 112, an activity detection module 114, a pocket detection module 116, an indoor-outdoor state module 122, and an indoor-outdoor determination module 124. The ALS feature extraction module 112 is configured to receive light intensity data from the ALS 152 and generate an indoor-outdoor feature indicator based on the light intensity data. The activity detection module 114 is configured to receive motion data from the ACC 156, the gyro sensor 158, the magnetometer 159, or any combinations thereof, and generate a motion activity indicator based on the motion data. The pocket detection module 116 is configured to receive proximity data from the proximity sensor 154 and generate an out-of-pocket indicator based on the proximity data. The indoor-outdoor state module 122 is configured to determine the state of the indoor detection algorithm based on the indoor-outdoor feature indicator, the motion activity indicator, and the out-of-pocket indicator. The indoor-outdoor determination module 124 is configured to determine the current environment of the electronic device 102 based on the outputs of the ALS feature extraction module 112, the indoor-outdoor state module 122, or a combination thereof. FIG. 2-4 and associated descriptions provide additional details of these implementations.

Application 130 is an algorithmic software engine providing functionality according to particular implementations of the electronic device 102. The application 130 can include programs, modules, scripts, processes, or other objects that can execute, change, delete, generate, or process application data. For example, application 130 can be implemented as Enterprise Java Beans (EJBs). Design-time components may have the ability to generate run-time implementations into different platforms, such as J2EE (Java 2 Platform, Enterprise Edition), or ABAP (Advanced Business Application Programming) objects. Although illustrated as a single application 130 in FIG. 1, two or more applications 130 can be installed and executed on the electronic device 102. Further, while illustrated as internal to the electronic device 102, one or more processes associated with the application 130 may be stored, referenced, or executed remotely. For example, a portion of an application may be an interface to a web service that is remotely executed. Moreover, an application may be a child or sub-module of another software module (not illustrated).

In some cases, the applications 130 can include a location based service application. The location based service application can receive the indoor detection results determined by the indoor-outdoor detection function 110. The location based service application can perform operations based on the indoor detection results. For example, the location based service application can initiate a software service if the electronic device 102 is in an indoor environment.

Data 132 can include various types of data, e.g., files, classes, frameworks, backup data, business objects, jobs, web pages, web page templates, database tables, repositories storing business or dynamic information, and other information including parameters, variables, algorithms, instructions, rules, constraints, or references thereto. The data 132 may include information that is associated with an application, a network, a user, and other information. For example, the data 132 may include data associated with application 130.

The operating system 134 represents system software that manages computer hardware and software resources and provides common services for the electronic device 102. Examples of the operating system 134 can include LINUX, UNIX, WINDOWS, MAC OS, ANDROID, IOS, or any other suitable conventional operating system.

The example communication subsystem 166 can be configured to provide wireless or wireline communication for data or control information provided by the processing unit 162. The communication subsystem 166 can include, for example, one or more antennas, at least one amplifier, a transceiver, a coupler, a low noise amplifier (LNA), a duplexer, a local oscillator, a mixer, a digital signal processing (DSP) unit, or any combinations thereof. In some implementations, the communication subsystem 166 can support multiple input multiple output (MIMO) transmissions. The communication subsystem 166 can be configured to communicate with a network and another device according to communications standard or protocol, including but not limited to the Global System for Mobile Communications (GSM), general packet radio service (GPRS), Code Division Multiple Access (CDMA), Wideband Code Division Multiple Access (WCDMA), Long Term Evolution (LTE), 5G, Wireless Local Area Network (WLAN or WiFi), email, short message service (SMS), and the like.

The example user interface 168 can include, for example, any of the following: one or more of a display or touch screen display (for example, a liquid crystal display (LCD), a light emitting diode (LED), an organic light emitting diode (OLED), or a micro-electromechanical system (MEMS) display), a keyboard or keypad, a trackball, a speaker, or a microphone. The user interface 168 can also include I/O interface, for example, a universal serial bus (USB) interface.

In one example operation, the indoor-outdoor detection function 110 receives light intensity data from the ALS 152. The indoor-outdoor detection function 110 determines an indoor-outdoor feature indicator based on the light intensity data. The indoor-outdoor detection function 110 determines, whether the electronic device 102 is in an indoor environment or an outdoor environment based on the indoor-outdoor feature indicator. Alternatively or additionally, whether the electronic device 102 is in an indoor environment or an outdoor environment is further determined based on proximity data from the proximity sensor 154 and motion data from the ACC 156, the gyro sensor 158, and the magnetometer 159. FIGS. 2-4 and associated descriptions provide additional details of these implementations and other example operations.

Turning to a general description, an electronic device, e.g., the electronic device 102, may include, without limitation, any of the following: computing device, mobile device, user equipment, user equipment device, user agent, user device mobile electronic device, user device, endpoint, Internet of Things (IoT) device, Enterprise of Things (EoT) device, mobile station, subscriber station, portable electronic device, mobile communications device, wireless modem, wireless terminal, television, printer or other peripheral, vehicle, or any other electronic device capable of sending and receiving data. Examples of an electronic device may include, without limitation, a cellular phone, personal data assistant (PDA), smart phone, laptop, tablet, personal computer (PC), pager, portable computer, portable gaming device, wearable electronic device, health/medical/fitness device, camera, or other mobile communications devices having components for communicating voice or data via a wireless communication network. The wireless communication network may include a wireless link over at least one of a licensed spectrum and an unlicensed spectrum.

While elements of FIG. 1 are shown as including various component parts, portions, or modules that implement the various features and functionality, nevertheless, these elements may instead, include a number of sub-modules, third-party services, components, libraries, and such, as appropriate. Furthermore, the features and functionality of various components can be combined into fewer components, as appropriate.

FIG. 2 is a flow diagram illustrating an example method 200 for an indoor detection process, according to an implementation. For clarity of presentation, the description that follows generally describes method 200 in the context of the other figures in this description. The method 200 can be implemented by an electronic device, e.g., the electronic device 102 illustrated in FIG. 1. However, it will be understood that the method 200 may be performed, for example, by any suitable system, environment, software, and hardware, or a combination of systems, environments, software, and hardware, as appropriate. In some implementations, various steps of the method 200 can be run in parallel, in combination, in loops, or in any order.

The method 200 begins at 202, where an electronic device receives light intensity data from an ALS in the electronic device. In some implementations, the electronic device can configure a sampling frequency for obtaining the light intensity detected by the ALS. The ambient light intensity is the light intensity of ambient light, measured in units of lux (lux). In some implementations, the sampling frequency can be set to multiples of alternating current (AC) frequency in different geographic regions. For example in North America, AC has a frequency of 60 Hertz (Hz). Thus, the sampling frequency can be set at 240 Hz. In Asia or other geographic regions, AC has a frequency of 50 Hz. Thus, the sampling frequency can be set at 200 Hz. The electronic device can also configure an on-duration for each sampling period during which the ALS is turned on to measure the ambient light intensity. In one implementation example, the sampling duration can be configured at 1 millisecond (ms). The electronic device can increase the sampling frequency, the on-duration, or both to increase the accuracy of the measurement result. The electronic device can also decrease the sampling frequency, the on-duration, or both to save battery power.

The electronic device can further process the light intensity data measured by the ALS. For example, while the light intensity data received from the ALS can be time domain data. The electronic device can convert the light intensity data to frequency domain by using a Fourier Transform. In one implementation example, the electronic device can apply a Short Time Fourier Transform (STFT) on overlapping slide-window segment of the time domain light intensity data received from the ALS, to obtain the spectral energy of the light intensity data. Other digital signal processing techniques, e.g., Fast Fourier Transform (FFT), can also be used to obtain the spectral energy in frequency domain.

FIG. 3 is a chart 300 illustrating spectral energy generated based on example light intensity data, according to an implementation. The x-axis of the chart 300 represents frequency, in units of 10 Hz. The y-axis of the chart 300 represents the spectral energy values, in units of dB. As shown in FIG. 3, the spectral energy of the light intensity data for this measurement has a peak spectral energy at about 60 Hertz (Hz). FIG. 3 also includes a frequency region 302 and a frequency region 304. The frequency region 302 spans from 0 to 10 Hz. The frequency region 304 spans from 55 Hz to 65 Hz.

At 212, the electronic device determines an indoor-outdoor feature indicator based on the spectral energy of the light intensity data. Most of the indoor light sources are powered by AC. Therefore, the spectral energy of the indoor light can have a peak value at frequency regions that are associated with AC. For example, if the electronic device is in an indoor environment in North America, the spectral energy of the ambient light detected by the electronic device may have a peak value at around 60 Hz, and reduced peak values at integer multiples of 60 Hz (e.g., 120 Hz), as shown in FIG. 3. If the electronic device is in an indoor environment in Asia or other geographic regions, the spectral energy of the ambient light detected by the electronic device may have a peak value at around 50 Hz, and reduced peak values at integer multiples of 50 Hz (e.g., 100 Hz). On the other hand, if the electronic device is in an outdoor environment, the spectral energy of the ambient light detected by the electronic device may have a peak value at around 0 Hz, which corresponds to the natural light.

Therefore, an indoor-outdoor feature indicator can be determined by comparing the spectral energy values over a frequency region associated with AC with a general spectral energy value. The general spectral energy value, also referred to as an average spectral energy value, can be determined by averaging the spectral energy over the frequency spectrum of the Fourier Transform. The frequency region associated with AC, also referred to as the AC frequency region, can be a frequency region around a center frequency of 60 Hz (for North America) or a center frequency of 50 Hz (for other geographic regions). In one implementation example, the frequency region associated with AC can have a width of 10 Hz. Thus, the spectral energy value for the AC frequency region can be determined by averaging the spectral energy over the frequency region between 55 Hz to 65 Hz for North America, as shown by the frequency region 304 in FIG. 3 (or between 45 Hz or 55 Hz for other geographic regions). In some cases, the electronic device can configure the width, the center frequency, or both of the AC frequency region. In one implementation, the electronic device can determine the geographic region that the electronic device is located, e.g., based on a user input or a wireless communication signal from a service provider, and set the center frequency of the AC frequency region as the determined AC frequency. Alternatively or in combination, the electronic device can configure the AC frequency region to cover both the center frequencies of 50 Hz and 60 Hz, e.g., an AC frequency region between 45 Hz to 65 Hz. Similarly, the electronic device can configure a natural light frequency region between 0 to 10 Hz based on the frequency of natural light, as shown by the frequency region 302 in FIG. 3.

In one implementation, the indoor-outdoor feature indicator can be determined by an indoor feature parameter. The indoor feature parameter can be determined based on a ratio between the spectral energy value of the AC frequency region (e.g., the frequency region 304 in FIG. 3), and the general spectral energy value. The electronic device can determine whether the ratio exceeds a first threshold. If the ratio exceeds the first threshold, the electronic device can determine that there is a high likelihood that the light sources for the ambient light are indoor light sources, and thus can set the indoor feature parameter to true. Alternatively, if the ratio does not exceed the first threshold, the electronic device can determine that there is a low likelihood that the light sources for the ambient light are indoor light sources, and thus can set the indoor feature parameter to false. The indoor-outdoor feature indicator can be set according to the indoor feature parameter.

Alternatively, the indoor-outdoor feature indicator can be determined by an outdoor feature parameter. Similarly to the indoor feature parameter, the outdoor feature parameter can be determined based on a ratio between the spectral energy value of the natural light frequency region (e.g., the frequency region 302 in FIG. 3), and the general spectral energy value. A second threshold can be used to determine the likelihood that the light source for the ambient light is natural light. If the ratio exceeds the second threshold, there is a high likelihood that the light source is natural light and the outdoor feature parameter can be set to true. Alternatively, if the ratio does not exceed the second threshold, the electronic device can determine that there is a low likelihood that the light source for the ambient light is natural light, and thus can set the outdoor feature parameter to false. The indoor-outdoor feature indicator can be set according to the outdoor feature parameter.

In some implementations, the indoor-outdoor feature indicator can be determined based on a combination of the indoor feature parameter and the outdoor feature parameter. If the indoor feature parameter and outdoor feature parameter both indicate that the device is indoor, i.e., the indoor feature parameter is true and the outdoor feature parameter is false, then the indoor-outdoor feature indicator can be set to indoor. If the indoor feature parameter and outdoor feature parameter both indicate that the device is outdoor, i.e., the indoor feature parameter is false and the outdoor feature parameter is true, then the indoor-outdoor feature indicator can be set to outdoor. On the other hand, if the indoor feature parameter and the outdoor feature parameter are indicating conflicting results, e.g., if they are both true or both false, the electronic device can set the indoor-outdoor feature indicator to intermediate. Using both the indoor feature indicator and the outdoor feature indicator can improve the accuracy of the indoor detection process.

In some cases, the indoor detection process can be further improved by including measurement results from other sensors, e.g., a proximity sensor and a motion sensor. As illustrated, at 204, the electronic device receives proximity data from a proximity sensor on the electronic device. The proximity sensor can emit an electromagnetic field or a beam of electromagnetic radiation, e.g., infrared, and detect changes in the field or return signal. Accordingly, the proximity data can indicate a presence of an object in proximity of an electronic device. At 214, the electronic device can determine an out-of-pocket indicator based on the proximity data. For example, if the proximity data indicates a presence of cloth or other soft materials in proximity of the electronic device, the electronic device can set the out-of-pocket indicator to false, indicating that the electronic device is in a pocket. If the proximity data does not indicate the presence of cloth or other soft materials in proximity of the electronic device, the electronic device can set the out-of-pocket indicator to true, indicating that the electronic device is out of a pocket.

At 206, the electronic device receives motion data from a motion sensor on the electronic device. The motion sensor can be an ACC, a gyro sensor, a magnetometer, or any combinations thereof. The motion data received from the ACC can indicate whether an acceleration of the electronic device is detected. The motion data received from a gyro sensor can indicate whether a rotation or tilting of the electronic device is detected. The motion data received from a magnetometer can indicate whether a change of the magnetic field surrounding the electronic device (likely caused by the movement of the electronic device) is detected. At 216, the electronic device can determine a motion activity indicator based on the motion data. For example, if the motion data from the ACC, the gyro sensor, or the magnetometer indicates a movement of the electronic device, e.g., an accelerating or rotating motion, the electronic device can set the motion activity indicator to true. If the motion data does not indicate any movement of the electronic device, or movement of the user holding such a device, the electronic device can set the motion activity indicator to false. FIG. 4 and associated descriptions provide additional details of these explanations.

At 220, the electronic the device determines whether the electronic device is in an indoor environment or an outdoor environment based on the indoor-outdoor feature indicator, the out-of-pocket indicator, the motion activity indicator, or any combinations thereof. In some implementations, the electronic device determines whether the electronic device is in an indoor environment or an outdoor environment based on the indoor-outdoor feature indicator discussed previously. If the indoor-outdoor feature indicator is set to indoor, then the electronic device determines that the electronic device is in an indoor environment. If the indoor-outdoor feature indicator is set to outdoor, then the electronic device determines that the electronic device is in an outdoor environment. If the indoor-outdoor feature indicator is set to intermediate, then the electronic device determines that it is unknown whether the current environment is indoor or outdoor.

In some cases, multiple indoor-outdoor feature indicators can be generated over time, and the electronic device can filter these indoor-outdoor feature indicators to determine the current environment. For example, if the electronic device generated four consecutive indoor-outdoor feature indicators, the first one is intermediate, and the next three are indoor, the electronic device can determine that the current environment is indoor. The filtering algorithms can be average, weighted average that is biased towards one of an indoor value or an outdoor value, weighted average that is biased towards recent values, or other filtering algorithms. The filtering approach can improve the accuracy of indoor detection process.

Alternatively or additionally, the electronic device can further take into account of the out-of-pocket indicator, the motion activity indicator, or both indicators in the indoor detection process. FIG. 4 illustrates an example indoor detection state diagram 400, according to an implementation. As illustrated, the state diagram 400 includes four states: an initialization state 402, an intermediate state 404, an indoor state 406, and an outdoor state 408.

The initialization state 402 represents the initial state of the indoor detection, where no input of the indoor-outdoor feature indicator has been received. The electronic device can be in the initialization state 402 when the indoor-outdoor detection function is activated. The indoor-outdoor detection function can be activated when the electronic device is powered up or reset. The indoor-outdoor detection function can also be activated by an application or system software operating on the electronic device.

The intermediate state 404 represents a state where the electronic device cannot determine whether the current environment is indoor or outdoor. The indoor state 406 represents a state where the electronic device determines that the current environment is indoor. The outdoor state 408 represents a state where the electronic device determines that the current environment is outdoor.

The solid lines in FIG. 4 represent possible transitions between each state. For example, the initialization state 402 can transition to the intermediate state 404, the indoor state 406, or the outdoor state 408 based on the indoor-outdoor feature indicator. As discussed previously, the indoor-outdoor feature indicator can be set to indoor, outdoor, or intermediate based on the spectral energy of different frequency regions. Accordingly, if the indoor-outdoor feature indicator is set to one of these values, the electronic device can transition to the corresponding state.

In some implementations, the state transition can be limited by the motion activity indicator, the out-of-pocket indicator, or both. For example, if the out-of-pocket indicator indicates that the electronic device is in the pocket, then it is likely that the ambient light detected by the electronic device may not be accurate enough to indicate an indoor or outdoor environment. In such case, the current state can be kept regardless of the input of indoor-outdoor feature indicators. Similarly, if the motion activity indicator indicates that no movement has been detected, then it is likely that the electronic device remains in the same environment. In such case, the current state can be kept regardless of the input of indoor-outdoor feature indicators. In some implementations, the electronic device can configure whether the state transitions are limited by the motion activity indicator, the out-of-pocket indicator, or both. In some cases, the state transition to the initialization state 402 can take place regardless of the values of the motion activity indicator or the out-of-pocket indicator.

The dash line lines in FIG. 4 represent the output from each state. The output 410 includes "indoor," "outdoor," and "unknown." For the indoor state 406, the output is "indoor." For the outdoor state 408, the output is "outdoor." For the initialization state 402 or the intermediate state 404, the output is "unknown."

In some implementations, the output of the indoor detection process can be provided to another application or system software operating on the electronic device. For example, after the electronic device determines whether the electronic device is indoor or outdoor, the electronic device can provide the determination result to a location based service application. Alternatively or additionally, the electronic device can output the determination on a user interface of the electronic device, e.g., displaying an icon on the screen of the electronic device. In some cases, the electronic device can trigger other operations if the electronic device determines that the electronic device is indoor. For example, the electronic device trigger operations related to patient safety if the electronic device determines that the electronic device is in an indoor environment of a hospital. The electronic device can also trigger different home automation applications if the electronic device determines that the electronic device is in an indoor environment of the home of the user.

Figure 5:
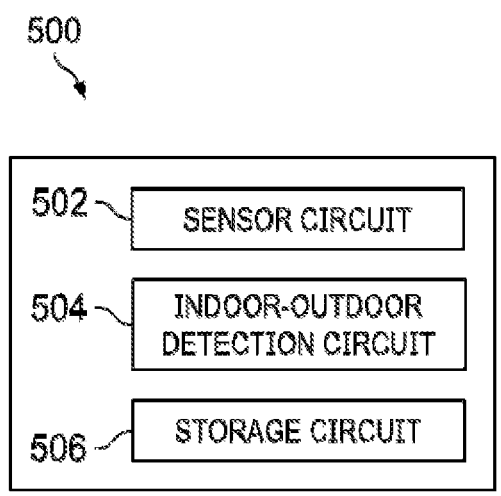
FIG. 5 is a schematic diagram illustrating an example structure of an electronic device described in the present disclosure, according to an implementation Like reference numbers and designations in the various drawings indicate like elements.

FIG. 5 is a schematic diagram illustrating an example structure of an electronic device 500 described in the present disclosure, according to an implementation. The electronic device 500 includes one or more sensors 502, an indoor-outdoor detection circuit 504, and a storage circuit 506. The indoor-outdoor detection circuit 504 can be coupled to, or capable of communicating with, the sensors 502 and the storage circuit 506. In some implementations, electronic device 500 can further include one or more circuits for performing any one or a combination of steps described in the present disclosure.

The sensors 502 can include an ALS, a motion sensor, a proximity sensor, or any combinations thereof. The sensors 502 are configured to generate light intensity data, proximity data, motion data, or any combinations thereof. The indoor-outdoor detection circuit 504 is configured to determine one or more indoor-outdoor feature indicators based on the light intensity data, determine an out-of-pocket indicator based on the proximity data, and determine a motion activity indicator based on the motion data. The indoor-outdoor detection circuit 504 is further configured to determine whether the electronic device is in an indoor environment or an outdoor environment based on the indoor-outdoor feature indicator, the out-of-pocket indicator, motion activity indicator, or any combinations thereof. The storage circuit 506 is configured to store the indoor-outdoor feature indicator, the out-of-pocket indicator, motion activity indicator, or any other data associated with the indoor detection process discussed in the present disclosure.

Described implementations of the subject matter can include one or more features, alone or in combination.

In a first implementation, a method for indoor-outdoor detection by an electronic device includes: receiving, from an ambient light sensor in the electronic device, light intensity data; determining, by one or more hardware processors in the electronic device, an indoor-outdoor feature indicator based on the light intensity data; and determining, by the one or more hardware processors, whether the electronic device is in an indoor environment or an outdoor environment based on the indoor-outdoor feature indicator.

The foregoing and other described implementations can each, optionally, include one or more of the following features:

A first feature, combinable with any of the following features, where the method further includes: receiving, from a proximity sensor in the electronic device, proximity data; determining, by the electronic device, an out-of-pocket indicator based on the proximity data; and where whether the electronic device is in the indoor environment or the outdoor environment is determined further based on the out-of-pocket indicator.

A second feature, combinable with any of the previous or following features, where the method further includes: receiving, from a motion sensor in the electronic device, motion data; determining, by the electronic device, a motion activity indicator based on the motion data; and where whether the electronic device is in the indoor environment or the outdoor environment is determined further based on the motion activity indicator.

A third feature, combinable with any of the previous or following features, where the motion sensor is one of an accelerometer, a gyro sensor, or a magnetometer.

A fourth feature, combinable with any of the previous or following features, where the method further includes: determining a plurality of indoor-outdoor feature indicators; and where whether the electronic device is in the indoor environment or the outdoor environment is determined based on the plurality of indoor-outdoor feature indicators.

A fifth feature, combinable with any of the previous or following features, where the determining the indoor-outdoor feature indicator based on the light intensity data includes: determining, based on the light intensity data, a general spectral energy value; determining, based on the light intensity data, a spectral energy value of a first frequency region; determining, a first indoor-outdoor feature parameter based on a ratio between the spectral energy value of the first frequency region and the general spectral energy value; determining, based on the light intensity data, a spectral energy value of a second frequency region; determining, a second indoor-outdoor feature parameter based on a ratio between the spectral energy value of the second frequency region and the general spectral energy value; and determining the indoor-outdoor feature indicator based on the first indoor-outdoor feature parameter and the second indoor-outdoor feature parameter.

A sixth feature, combinable with any of the previous or following features, where first frequency region is associated with a frequency of alternating current.

A seventh feature, combinable with any of the previous features, where the second frequency region is associated with natural light.

In a second implementation, an electronic device includes: an ambient light sensor; a non-transitory memory storage comprising instructions; and one or more hardware processors in communication with the memory storage, wherein the one or more hardware processors execute the instructions to: receive, from the ambient light sensor, light intensity data; determine an indoor-outdoor feature indicator based on the light intensity data; and determine whether the electronic device is in an indoor environment or an outdoor environment based on the indoor-outdoor feature indicator.

The foregoing and other described implementations can each, optionally, include one or more of the following features:

A first feature, combinable with any of the following features, where the one or more hardware processors further execute the instructions to: receive, from a proximity sensor in the electronic device, proximity data; determine, by the electronic device, an out-of-pocket indicator based on the proximity data; and where whether the electronic device is in the indoor environment or the outdoor environment is determined further based on the out-of-pocket indicator.

A second feature, combinable with any of the previous or following features, where the one or more hardware processors further execute the instructions to: receive, from a motion sensor in the electronic device, motion data; determine, by the electronic device, a motion activity indicator based on the motion data; and where whether the electronic device is in the indoor environment or the outdoor environment is determined further based on the motion activity indicator.

A third feature, combinable with any of the previous or following features, where the motion sensor is one of an accelerometer, a gyro sensor, or a magnetometer.

A fourth feature, combinable with any of the previous or following features, where the one or more hardware processors further execute the instructions to: determine a plurality of indoor-outdoor feature indicators; and where whether the electronic device is in the indoor environment or the outdoor environment is determined based on the plurality of indoor-outdoor feature indicators.

A fifth feature, combinable with any of the previous or following features, where the one or more hardware processors execute the instructions to determine the indoor-outdoor feature indicator based on the light intensity data comprises the one or more hardware processors execute the instructions to: determine, based on the light intensity data, a general spectral energy value; determine, based on the light intensity data, a spectral energy value of a first frequency region; determine, a first indoor-outdoor feature parameter based on a ratio between the spectral energy value of the first frequency region and the general spectral energy value; determine, based on the light intensity data, a spectral energy value of a second frequency region; determine, a second indoor-outdoor feature parameter based on a ratio between the spectral energy value of the second frequency region and the general spectral energy value; and determine the indoor-outdoor feature indicator based on the first indoor-outdoor feature parameter and the second indoor-outdoor feature parameter.

A sixth feature, combinable with any of the previous or following features, where first frequency region is associated with a frequency of alternating current.

A seventh feature, combinable with any of the previous features, where the second frequency region is associated with natural light.

In a third implementation, a non-transitory computer-readable medium storing computer instructions for processing a data packet in a communication network, that when executed by one or more hardware processors, cause the one or more hardware processors of a router to perform operations including: receiving, from an ambient light sensor in an electronic device, light intensity data; determining, by one or more hardware processors in the electronic device, an indoor-outdoor feature indicator based on the light intensity data; and determining, by the one or more hardware processors, whether the electronic device is in an indoor environment or an outdoor environment based on the indoor-outdoor feature indicator.

The foregoing and other described implementations can each, optionally, include one or more of the following features:

A first feature, combinable with any of the following features, where the operations further includes: receiving, from a proximity sensor in the electronic device, proximity data; determining, by the electronic device, an out-of-pocket indicator based on the proximity data; and where whether the electronic device is in the indoor environment or the outdoor environment is determined further based on the out-of-pocket indicator.

A second feature, combinable with any of the previous or following features, where the operations further includes: receiving, from a motion sensor in the electronic device, motion data; determining, by the electronic device, a motion activity indicator based on the motion data; and where whether the electronic device is in the indoor environment or the outdoor environment is determined further based on the motion activity indicator.

A third feature, combinable with any of the previous or following features, where the motion sensor is one of an accelerometer, a gyro sensor, or a magnetometer.

A fourth feature, combinable with any of the previous or following features, where the operations further includes: determining a plurality of indoor-outdoor feature indicators; and where whether the electronic device is in the indoor environment or the outdoor environment is determined based on the plurality of indoor-outdoor feature indicators.

A fifth feature, combinable with any of the previous or following features, where the determining the indoor-outdoor feature indicator based on the light intensity data includes: determining, based on the light intensity data, a general spectral energy value; determining, based on the light intensity data, a spectral energy value of a first frequency region; determining, a first indoor-outdoor feature parameter based on a ratio between the spectral energy value of the first frequency region and the general spectral energy value; determining, based on the light intensity data, a spectral energy value of a second frequency region; determining, a second indoor-outdoor feature parameter based on a ratio between the spectral energy value of the second frequency region and the general spectral energy value; and determining the indoor-outdoor feature indicator based on the first indoor-outdoor feature parameter and the second indoor-outdoor feature parameter.

A sixth feature, combinable with any of the previous or following features, where first frequency region is associated with a frequency of alternating current.

A seventh feature, combinable with any of the previous features, where the second frequency region is associated with natural light.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., or less than 5 secs. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, for example, a Central Processing Unit (CPU), a Field Programmable Gate Array (FPGA), or an Application-specific Integrated Circuit (ASIC). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a ROM or a Random Access Memory (RAM), or both. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a Personal Digital Assistant (PDA), a mobile audio or video player, a game console, a Global Positioning System (GPS) receiver, or a portable storage device, for example, a Universal Serial Bus (USB) flash drive, to name just a few.

Computer-readable media (transitory or non-transitory, as appropriate) suitable for storing computer program instructions and data includes non-volatile memory, media and memory devices, including by way of example, semiconductor memory devices, for example, Erasable Programmable Read-Only Memory (EPROM), Electrically Erasable Programmable Read-Only Memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a Cathode Ray Tube (CRT), Liquid Crystal Display (LCD), Light Emitting Diode (LED), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a Command Line Interface (CLI) that processes information and efficiently presents the information results to the user. In general, a GUI may include a plurality of User Interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a Local Area Network (LAN), a Radio Access Network (RAN), a Metropolitan Area Network (MAN), a Wide Area Network (WAN), Worldwide Interoperability for Microwave Access (WIMAX), a Wireless Local Area Network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM)

cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain this disclosure. Other changes, substitutions, and alterations are also possible without departing from the spirit and scope of this disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A method performed by an electronic device for indoor-outdoor detection, comprising:
   receiving light intensity data from an ambient light sensor in the electronic device;
   determining, by one or more hardware processors in the electronic device, an indoor-outdoor feature indicator based on the light intensity data;
   receiving proximity data from a proximity sensor in the electronic device;
   determining, by the one or more hardware processors, an out-of-pocket indicator based on the proximity data; and
   determining, by the one or more hardware processors, whether the electronic device is in an indoor environment or an outdoor environment based on the indoor-outdoor feature indicator and the out-of-pocket indicator.

2. The method according to claim 1, further comprising:
   receiving, from a motion sensor in the electronic device, motion data; and
   determining, by the electronic device, a motion activity indicator based on the motion data, wherein determining whether the electronic device is in the indoor environment or the outdoor environment is further based on the motion activity indicator.

3. The method according to claim 2, wherein the motion sensor is one of an accelerometer, a gyro sensor, or a magnetometer.

4. The method according to claim 1, further comprising:
   determining a plurality of indoor-outdoor feature indicators, wherein determining whether the electronic device is in the indoor environment or the outdoor environment is based on the plurality of indoor-outdoor feature indicators.

5. The method according to claim 1, wherein the determining the indoor-outdoor feature indicator based on the light intensity data comprises:
   determining, based on the light intensity data, a general spectral energy value;
   determining, based on the light intensity data, a spectral energy value of a first frequency region;
   determining a first indoor-outdoor feature parameter based on a ratio between the spectral energy value of the first frequency region and the general spectral energy value;
   determining, based on the light intensity data, a spectral energy value of a second frequency region;
   determining a second indoor-outdoor feature parameter based on a ratio between the spectral energy value of the second frequency region and the general spectral energy value; and
   determining the indoor-outdoor feature indicator based on the first indoor-outdoor feature parameter and the second indoor-outdoor feature parameter.

6. The method according to claim 5, wherein the first frequency region is associated with a frequency of alternating current.

7. The method according to claim 5, wherein the second frequency region is associated with natural light.

8. An electronic device, comprising:
   an ambient light sensor;
   a non-transitory memory storage comprising instructions; and
   one or more hardware processors in communication with the memory storage, wherein the one or more hardware processors execute the instructions to:
      receive, from the ambient light sensor, light intensity data;
      determine an indoor-outdoor feature indicator based on the light intensity data; receive, from a proximity sensor in the electronic device, proximity data; determine an out-of-pocket indicator based on the proximity data; and determine whether the electronic device is in an indoor environment or an outdoor environment based on the indoor-outdoor feature indicator and the out-of-pocket indicator.

9. The electronic device according to claim 8, wherein the one or more hardware processors further execute the instructions to:

receive, from a motion sensor in the electronic device, motion data; and determine a motion activity indicator based on the motion data, wherein determining whether the electronic device is in the indoor environment or the outdoor environment is further based on the motion activity indicator.

10. The electronic device according to claim 9, wherein the motion sensor is one of an accelerometer, a gyro sensor, or a magnetometer.

11. The electronic device according to claim 8, wherein the one or more hardware processors further execute the instructions to:

determine a plurality of indoor-outdoor feature indicators, wherein determining whether the electronic device is in the indoor environment or the outdoor environment is based on the plurality of indoor-outdoor feature indicators.

12. The electronic device according to claim 8, wherein the one or more hardware processors execute the instructions to determine the indoor-outdoor feature indicator based on the light intensity data comprises the one or more hardware processors execute the instructions to:

determine, based on the light intensity data, a general spectral energy value;

determine, based on the light intensity data, a spectral energy value of a first frequency region;

determine a first indoor-outdoor feature parameter based on a ratio between the spectral energy value of the first frequency region and the general spectral energy value;

determine, based on the light intensity data, a spectral energy value of a second frequency region;

determine a second indoor-outdoor feature parameter based on a ratio between the spectral energy value of the second frequency region and the general spectral energy value; and determine the indoor-outdoor feature indicator based on the first indoor-outdoor feature parameter and the second indoor-outdoor feature parameter.

13. The electronic device according to claim 12, wherein the first frequency region is associated with a frequency of alternating current.

14. The electronic device according to claim 12, wherein the second frequency region is associated with natural light.

15. A non-transitory computer-readable medium storing computer instructions, that when executed by one or more hardware processors in an electronic device, cause the one or more hardware processors to perform operations comprising:

receiving, from an ambient light sensor in the electronic device, light intensity data;

determining, by the one or more hardware processors in the electronic device, an indoor-outdoor feature indicator based on the light intensity data; receive, from a proximity sensor in the electronic device, proximity data; determine an out-of-pocket indicator based on the proximity data; and determining, by the one or more hardware processors, whether the electronic device is in an indoor environment or an outdoor environment based on the indoor-outdoor feature indicator and the out-of-pocket indicator.

16. The non-transitory computer-readable medium according to claim 15, wherein the operations further comprises:

receiving, from a motion sensor in the electronic device, motion data; and determining, by the electronic device, a motion activity indicator based on the motion data, wherein determining whether the electronic device is in the indoor environment or the outdoor environment is further based on the motion activity indicator.

17. The non-transitory computer-readable medium according to claim 16, wherein the motion sensor is one of an accelerometer, a gyro sensor, or a magnetometer.

* * * * *